(12) United States Patent
Dahlman et al.

(10) Patent No.: US 8,638,697 B2
(45) Date of Patent: Jan. 28, 2014

(54) METHOD AND ARRANGEMENT IN A TELECOMMUNICATION SYSTEM

(75) Inventors: Erik Dahlman, Bromma (SE); Stefan Parkvall, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 262 days.

(21) Appl. No.: 12/811,980

(22) PCT Filed: Dec. 4, 2008

(86) PCT No.: PCT/SE2008/051410
§ 371 (c)(1),
(2), (4) Date: Jul. 7, 2010

(87) PCT Pub. No.: WO2009/088344
PCT Pub. Date: Jul. 16, 2009

(65) Prior Publication Data
US 2010/0278082 A1    Nov. 4, 2010

(51) Int. Cl.
*H04J 3/00* (2006.01)
(52) U.S. Cl.
USPC ........ 370/280; 370/458; 370/468; 455/452.1; 455/509; 709/226
(58) Field of Classification Search
None
See application file for complete search history.

(56) References Cited

U.S. PATENT DOCUMENTS

| | | | |
|---|---|---|---|
| 6,141,336 A | | 10/2000 | Bauchot et al. |
| 2004/0142695 A1* | | 7/2004 | O'Neill et al. ............... 455/450 |
| 2007/0230326 A1 | | 10/2007 | Pandoh et al. |
| 2008/0259856 A1* | | 10/2008 | Frederiksen et al. ......... 370/329 |
| 2009/0092067 A1* | | 4/2009 | Sudarshan et al. ........... 370/281 |
| 2010/0290509 A1* | | 11/2010 | Dalsgaard et al. ........... 375/220 |
| 2010/0296477 A1* | | 11/2010 | Hason et al. .................. 370/330 |

FOREIGN PATENT DOCUMENTS

| EP | 1 447 943 | 8/2004 |
|---|---|---|
| WO | 95/32566 | 11/1995 |

OTHER PUBLICATIONS

International Search Report for PCT/SE2008/051410, mailed Jul. 8, 2009.

* cited by examiner

*Primary Examiner* — Yemane Mesfin
*Assistant Examiner* — Khoa Huynh
(74) *Attorney, Agent, or Firm* — Nixon & Vanderhye P.C.

(57) ABSTRACT

A radio base station generates and assigns a different DL/UL transmission pattern to each terminal of a set of mobile terminals that are mutually unique patterns which allow each terminal to receive downlink system information thereon.

8 Claims, 4 Drawing Sheets

FDD
$f_{DL}$ 
$f_{UL}$ 
TDD
$f_{DL}/f_{UL}$ 
 Downlink Transmission
 Uplink Transmission
Fig. 1
(Prior Art)
Fig. 2
 Downlink Transmission
 Uplink Transmission
(Prior Art)

METHOD AND ARRANGEMENT IN A TELECOMMUNICATION SYSTEM

This application is the U.S. national phase of International Application No. PCT/SE2008/051410, filed 4 Dec. 2008, which designated the U.S. and claims priority to U.S. Application No. 61/020,452, filed 11 Jan. 2008, which are hereby incorporated by reference.

TECHNICAL FIELD

The technology relates to a method and a device for assigning transmission resources to mobile terminals in a telecommunications system.

BACKGROUND

The duplex arrangement of a radio-access technology defines how uplink (mobile-terminal-to-network) and downlink (network-to-mobile-terminal) transmission can co-exist in a telecommunications system. There are basically two duplex schemes available. These are depicted in FIG. 1.

Frequency Division Duplex (FDD) implies that downlink (DL) and uplink (UL) transmissions take place on different frequencies, so-called frequency separation. In case of FDD, downlink and uplink transmission can thus take place simultaneously on the same radio link, i.e. to/from the same mobile terminal.

Time Division Duplex (TDD) implies that downlink and uplink transmission take place in different time slots, so-called time separation. In case of TDD, downlink and uplink transmission can thus take place on the same frequency (non-FDD), i.e. a single frequency is sufficient to support both downlink and uplink transmission.

In case of TDD, the specific sets of time slots assigned for downlink and uplink transmission respectively is referred to as the DL/UL assignment or the DL/UL pattern. Different DL/UL patterns may be configured, e.g. depending on the need for different capacity for downlink and uplink transmission. FIG. 2 illustrates two different DL/UL patterns with a 1:1 DL/UL assignment ratio (one downlink time slot for each uplink time slot) and a 4:1 DL/UL assignment ratio (four downlink time slots for each uplink time slot) respectively.

Typically the period of the DL/UL pattern can be one frame, where a frame may e.g. be of length 10 ms and consist of 10 subframes, each of length 1 ms. This means that the DL/UL pattern repeats itself every frame. However, the DL/UL assignment could also have a longer period, e.g. a period of two frames (20 ms) or four frames (40 ms), implying that the DL/UL pattern repeats itself every 20 ms and every 40 ms respectively.

A special case of FDD operation, i.e. duplex operation with downlink and uplink transmission on different frequencies, is so-called half-duplex operation. Half-duplex operation implies that, from a UE point-of-view, uplink and downlink transmissions do not take place simultaneously, see FIG. 3. Thus, in some sense, half-duplex operation can be seen as a combination of FDD and TDD for a given link. It should be noted though that, on system level and from a base station point-of-view, uplink and downlink transmission may still be simultaneous in case of half-duplex operation within cell.

One reason for employing half-duplex operation is to reduce mobile terminal complexity as the requirements on the terminal, duplex filter can be relaxed. The terminal is also termed user equipment (UE) or mobile station.

One way to implement half-duplex operation is to, for each mobile terminal, assign a DL/UL pattern, similar to TDD as discussed above. This pattern can then be repeated with a period of N frames, where N is a small integer equal to or larger than one, (for example N=1, N=2, or N=4).

In order to efficiently utilize both the uplink and downlink radio resources in case of half-duplex FDD, different mobile terminals should be assigned different DL/UL patterns. This is a result from the fact that, for each subframe, there should be at least one downlink transmission and one uplink transmission. Thus, at least one mobile terminal should be assigned a DL/UL pattern with the given subframe assigned for downlink transmission and at least one mobile terminal should be assigned a DL/UL pattern with the given subframe assigned for uplink transmission. Thus, the two patterns could not be identical.

In contrast, if, for a given subframe, no mobile terminal is assigned a DL/UL pattern with the subframe assigned for uplink transmission, the uplink radio resource is not fully utilized. The same is true for the downlink.

However, in a radio access system, some specific subframes are often used for downlink transmission of so-called system information. The mobile terminals should be able to read this information in order to understand the status of the system, how to access the system, etc. As an example, in Long Term Evolution (LTE) some system information, more specifically the so-called Master Information Block (MIB), is transmitted on the BCH transport channel during the first subframe of each 10 ms frame. Additional system information may be periodically transmitted on the downlink within other subframes.

In case of a periodic DL/UL pattern, with a period being (a multiple of) a frame, there may then be two alternatives:

No mobile terminal is assigned a DL/UL pattern with uplink transmission in subframes where system information is transmitted. The problem with this alternative is that, in these subframes, there can be no uplink transmission and thus uplink radio-resources are thus wasted.

Some mobile terminals are assigned DL/UL patterns with uplink transmission in the subframes where system information is transmitted. These mobile terminals are then not able to read the system information, which is an unacceptable situation as knowledge of the system information is required for proper operation of a mobile terminal.

As a result from the above there exists a need for a method and a device for assigning DL/UL patterns to mobile terminals in a communications system that removes or reduces one or some of the problems indicated above.

SUMMARY

It is an object to provide a solution for assigning DL/UL patterns to mobile terminals in a communications system that at least to a certain extent alleviates one or some of the problems indicated above.

It is also an object to assign DL/UL patterns in a system e.g. operating in half-duplex mode in such a way that enables optimized use of available transmission resources.

It is furthermore an object to provide a method and arrangement for assigning DL/UL patterns to mobile terminals, e.g. operating in half-duplex mode, which allows for downlink system information to he received therein.

At least one of the above objects is achieved with the method, mobile terminal or the base station according to the appended claims. A method and a user equipment are provided wherein the DL/UL pattern for a mobile terminal is generated such that downlink system information transmissions will take place in different subframes of the pattern.

Thus, the pattern is generated such that downlink system information transmissions will not always take place in subframes of the pattern assigned for uplink transmission.

In accordance with one example embodiment, a method in a base station of a wireless communication system assigns a DL/UL transmission pattern which is different and unique to each terminal of a set of mobile terminals to allow receiving downlink system information on the respective different and unique pattern of each terminal.

For example in a first step a DL/UL pattern for a specific terminal of a set is generated. The pattern for the specific terminal different as compared to patterns generated for other terminals of the set, wherein the pattern is generated such that downlink system information transmissions will only take place in a subset of the subframes of the pattern assigned for uplink transmission. The generated pattern is then assigned to the specific terminal of the set.

In accordance with one embodiment the assigned DL/UL patterns are periodic with a period M which is not a multiple of the frame length N.

In accordance with one embodiment the assigned DL/UL patterns are pseudo-random.

In accordance with one embodiment the DL/UL patterns are extended with a rule stating that certain subframes are to be used for downlink transmission even if they are uplink subframes according to the assigned periodic DL/UL pattern.

Thus, according to one embodiment, the unique DL/UL pattern is generated as a periodic pattern with a period of subframes M, which is not a multiple of a frame length N, where N equals the number of subframes in the frame.

In an alternative embodiment, the unique DL/UL pattern is generated as a non-periodic pseudo-random pattern by a pseudo random generator such as a shift register, or the unique pattern is alternatively generated as a periodic pattern with a period equal to a multiple of a frame and comprising an additional rule defining all subframes where system information is transmitted as downlink frames.

According to a further embodiment, the unique pattern is determined by assigning a period of M subframes, where M is selected so that m*M=k*K only for relatively large integer values for m and k, wherein K is the number of subframes constituting a frame.

A base station, such as an eNodeB, of a wireless communication system generates and assigns a DL/UL transmission pattern to a specific terminal of a set of mobile terminals. The pattern is unique when compared to patterns of the other terminals of the set. The unique pattern allows receiving downlink system information thereon. The base station is arranged to perform the method according to the above.

The example embodiments described provide an advantage of allowing full utilization of both the downlink and uplink radio resources without prohibiting the acquiring of system information for all mobile terminals.

As is realized by the person skilled in the art different described features can be combined in the same embodiment.

BRIEF DESCRIPTION OF THE DRAWINGS

Example embodiments will now be described in more detail by way of non-limiting examples and with reference to the accompanying drawings, in which:

FIG. 1 schematically illustrates Frequency Division Duplex (FDD) and Time Division Duplex (TDD).

FIG. 2 schematically illustrates different DL/UL patterns in case of TDD.

DETAILED DESCRIPTION

In the following, various example embodiments will be described. Generally, a method and radio base station for generating and assigning a different DL/UL transmission pattern to each terminal of a set of mobile terminals are described, which mutually unique patterns each allows receiving downlink system information thereon to the respective terminal.

Figure 3:
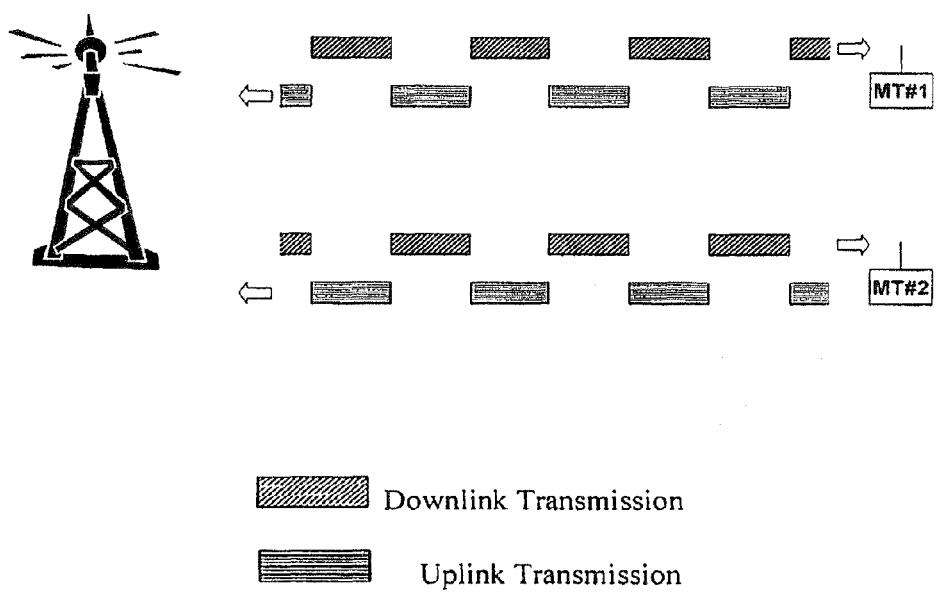
FIG. 3 schematically illustrates half-duplex operation.
Figure 4:
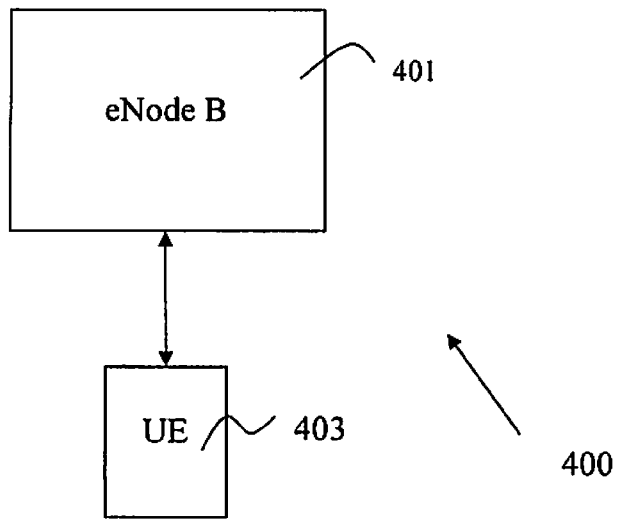
FIG. 4 is a general view of a cellular radio system.

In FIG. 4, a general view of a cellular radio system 400 is depicted. The system can for example be a Long-Term Evolution (LTE) system or a similar system. The system 400 comprises a base station (eNode B) 401. The base station 401 serves a number of mobile terminals, usually termed User Equipment (UE) 403, located within the area covered by the base station 401.

The Node B communicates with the UEs using a suitable DL/UL pattern for example using half-duplex transmission. The Uplink/Downlink pattern for a User equipment is generated such that downlink system information transmissions will take place in different subframes of the pattern assigned for uplink transmission.

In accordance with one embodiment the assigned DL/UL patterns are periodical with a period M which is not a multiple of the frame length N.

In accordance with one embodiment the assigned DL/UL patterns are pseudo-random.

In accordance with one embodiment the DL/UL patterns are extended with a rule stating that certain subframes are to be used for downlink transmission even if they are uplink subframes according to the assigned periodic DL/UL pattern.

Exemplary methods and radio base stations also termed NodeBs or eNodeBs adapted to generate such DL/UL patterns are described more in detail in the following. According to a first embodiment it is assumed that a frame consists of N subframes, where e.g. N may be set to 10 as is suitable in a Long Term Evolution (LTE) system. Instead of assigning different periodic DL/UL patterns to different mobile terminals with a period equal to a multiple of the frame length, e.g. one, two, or four frames, the different mobile terminals are assigned patterns with a period of M subframes, where M should be selected so that m*M=k*N only for relatively large integers m and k. As an example, by selecting M=9 (and assuming N=10), the above relation will hold for m=10, k=9, but not for smaller values of k. As a consequence, if a given subframe within a frame is assigned as an uplink subframe in a certain frame n, this subframe will also be assigned as an uplink subframe in frame n+9 but not necessarily in frames in between. Thus it can be avoided that the same subframe, e.g. a subframe #0, will be assigned as uplink subframe in all frames.

Figure 5A:
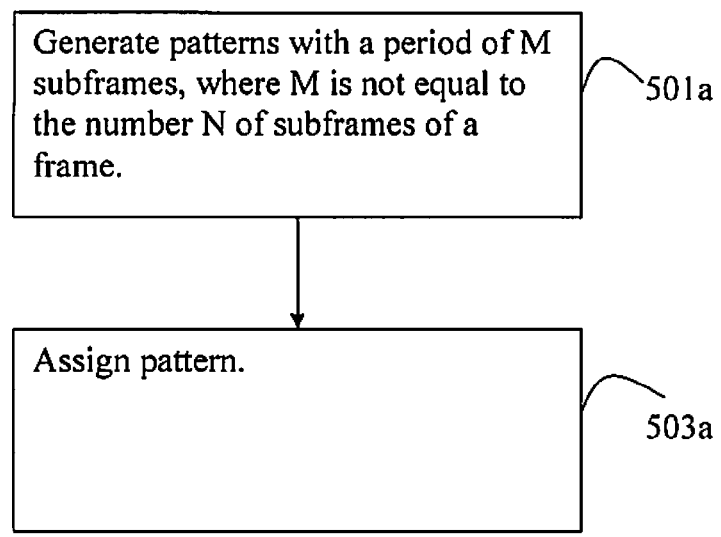
FIGS. 5a-5c are flowcharts illustrating steps performed when generating a DL/UL pattern.

In FIG. 5a procedural steps performed in a radio base station eNodeB when generating an DL/UL transmission patterns for a particular mobile station of a set of mobile terminals also termed User Equipment (UE) in accordance with the above are shown. First in a step 501a patterns with a period of M subframes, where M is not equal to the number N of subframes of a frame are generated. In one embodiment M is selected so that m*M=k*N only for relatively large integers m and k are generated. Next in a step 503a the generated pattern is assigned to the mobile station of the set of mobile terminals.

According to a second embodiment, instead of assigning different periodic DL/UL patterns to different mobile terminals with a period equal to a multiple of the frame length, e.g. one, two, or four frames, the different mobile terminals are assigned pseudo-random patterns with no specific period. As the system information is transmitted with typically a period being a multiple of a frame, with a pseudo-random DL/UL pattern, the system-information transmissions will not always take place in subframes assigned for uplink transmission for some mobile terminals. Thus, all mobile terminals can acquire the system information, although, in some cases, with a certain delay (as the first occurrence of the system information may be in a subframe assigned for uplink transmission).

Figure 5B:
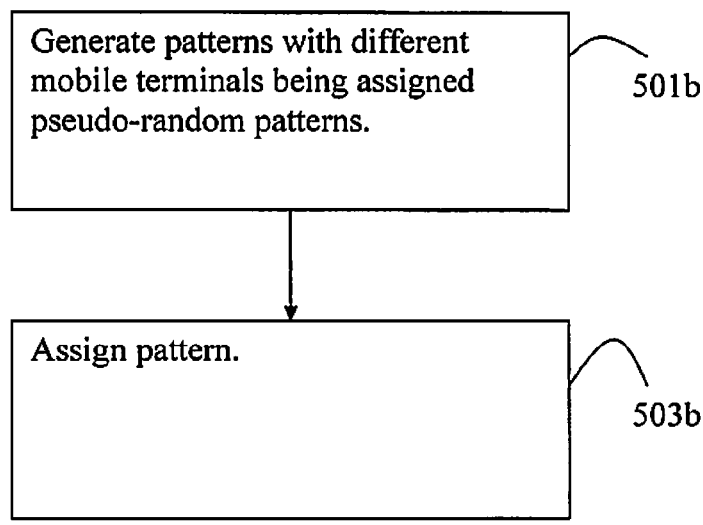

In FIG. 5b procedural steps performed in a radio base station NodeB when generating an DL/UL transmission patterns for a particular mobile terminal of a set of mobile stations also termed User Equipment (UE) in accordance with the above are shown. First in a step 501b patterns with different mobile terminals being assigned pseudo-random patterns with no specific period are generated. Next in a step 503b a generated pattern is assigned to the mobile station of the set of mobile stations.

The pseudo-random DL/UL pattern can e.g. be generated from a shift register with feed back or any other of the methods described in literature. The output of such a shift-register-based pseudo-random generation will be a sequence of 1:s and 0:s. An output of 1 at time n could e.g. mean that subframe n is assigned for downlink transmission while a 0 could mean that the subframe is assigned for uplink transmission.

Different mobile terminals should be assigned different DL/UL patterns. This could e.g. be done by initiating the shift registers with different initial values for the different mobile terminals.

The pseudo-random generators should be implemented on the network side, in the base station, as well as in the mobile terminal, in order for both the base station and mobile terminal to know what subframes are downlink subframes and what subframes are uplink subframes for the specific mobile terminal.

Figure 5C:
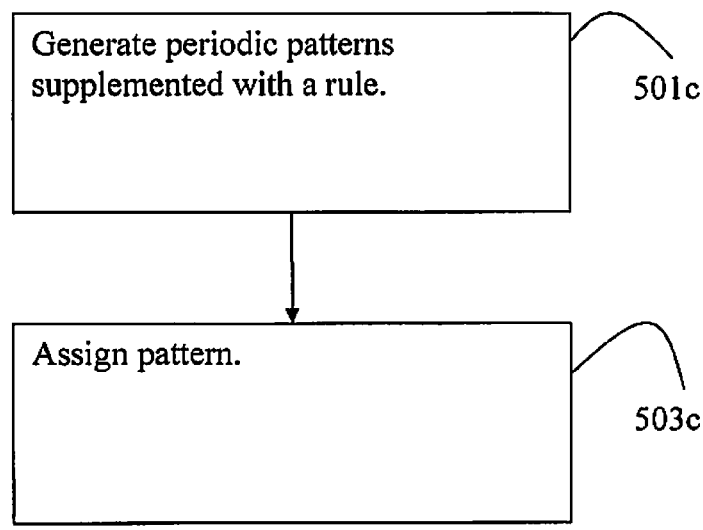

In one embodiment, each mobile terminal is assigned a DL/UL pattern that is periodic with a period equal to a multiple of a subframe as in the "state-of-the-art". However, an additional rule is added stating that all or a subset of subframes where system information is being transmitted are assigned as downlink subframes. Thus, when a downlink/uplink pattern is generated the pattern is supplemented by shifting some of the uplink transmission slots to downlink transmission slots. In particular slots corresponding to downlink transmission of system information can be changed. In FIG. 5c procedural steps performed in a radio base station NodeB when generating an DL/UL transmission patterns for a particular mobile station of a set of mobile stations also termed User Equipment (UE) in accordance with the above are shown. First in a step 501c periodic patterns supplemented with a rule in accordance with which all or a subset of subframes where system information is being transmitted are always downlink subframes are generated. Next in a step 503c a generated pattern is assigned to the mobile station of the set of mobile stations.

In this way the mobile terminal can receive all or some downlink subframes in which system information is transmitted.

The solution may thus, according to this embodiment, be generalized so that, in addition to specifying a periodic DL/UL pattern of a certain period, the UE is also informed about an additional set of subframes that are assigned for DL transmission. This set of subframes could correspond to the full set of subframes in which system information is transmitted, in which case the solution is the same as above. However, the set of subframes could also correspond to a subset of the set of subframes in which system information is transmitted. In this case, the loss of uplink resource utilization is reduced at the expense of a delay in the reception of system information.

The embodiments allow for full utilization of both the downlink and uplink radio resources without prohibiting the acquiring of system information for all mobile terminals. This made possible by in an existing pattern substituting some uplink transmissions with downlink transmissions thereby ensuring that important downlink information, in particular system information, can be transmitted to the respective User equipments.

The procedural steps described may be implemented by software executed by a processor in one or several network nodes, such as a mobile terminal also called UE or mobile station, and/or a radio base station also called NodeB or eNodeB.

Any examples and terminology relating to 3GPP LTE standard being used herein should not be seen as limiting the scope of the claims, the methodology of which in principle can be applied to other systems as well, including e.g. WCDMA.

The described subject matter is of course not limited to the above described embodiments, but can be modified within the scope of the claims.

The invention claimed is:

1. A method in a node of a cellular radio system for generating downlink/uplink subframe transmission patterns used in frame-based, half-duplex communication between a mobile terminal and a radio base station, wherein each frame includes a total number of N subframes, the method comprising the steps of:

generating, by the node, a downlink/uplink, half-duplex, subframe transmission pattern for a mobile terminal such that downlink system information transmissions will partly take place in downlink subframes of the generated downlink/uplink, half-duplex, subframe transmission pattern, wherein the downlink/uplink, half-duplex, subframe transmission pattern is periodic with a period of M subframes, and M is not a multiple of the total number of N subframes, wherein the period M is a fixed value for a duration of a communications session involving the mobile terminal and is selected so that m×M=k×N only for integer values for m and k that exceed a predetermined minimum threshold value, and assigning, by the node, the generated downlink/uplink, half-duplex, subframe transmission pattern to the mobile terminal, wherein the radio base station and the mobile terminal communicate using a half-duplex transmission scheme in accordance with the generated downlink/uplink, half-duplex, subframe transmission pattern.

2. The method according to claim 1, wherein the downlink/uplink subframe transmission pattern is modified with a rule that forces certain subframes in the pattern to be used for downlink transmission even if they are uplink subframes according to the periodic downlink/uplink subframe transmission pattern.

3. The method according to claim 1, wherein the method is performed in a radio base station.

4. A mobile terminal for use in a cellular radio system, the mobile terminal being configured to communicate via frames with a radio base station, each frame including N total subframes, using a downlink/uplink, half-duplex, subframe transmission pattern, the mobile terminal comprising:

a processor configured to communicate with the radio base station over a radio interface using the downlink/uplink, half-duplex, subframe transmission pattern in which downlink system information will partly take place in downlink subframes of the downlink/uplink, half-duplex, subframe transmission pattern, wherein an assigned downlink/uplink, half-duplex, subframe transmission pattern is a periodic half-duplex subframe pattern with a period M which is not a multiple of the total number of frames N, and wherein the period M is a fixed value for a duration of a communications session involving the mobile terminal and is selected so that m×M=k×N only for integer values for m and k that exceed a predetermined minimum threshold value.

5. The mobile terminal according to claim 4, wherein the processor is configured to modify the periodic downlink/uplink, half-duplex, subframe transmission pattern with a rule forcing certain subframes to be used for downlink transmission even if they are uplink subframes according to the periodic downlink/uplink, half-duplex, subframe transmission pattern.

6. A node of a cellular radio system for generating downlink/uplink subframe transmission patterns used in frame-based communications between a mobile terminal and a radio base station, where each frame includes total number of subframes N, the node comprising:

a processor configured to generate a downlink/uplink, half-duplex, subframe transmission pattern for a mobile terminal such that downlink system information transmissions will partly take place in downlink subframes of the downlink/uplink, half-duplex, subframe transmission pattern, wherein the processor is configured to assign the downlink/uplink, half-duplex, subframe transmission pattern that is periodic with a period M which is not a multiple of the total number of subframes N, wherein the period M is a fixed value for a duration of a communications session involving the mobile terminal and is selected so that m×M=k×N only for integer values for m and k that exceed a predetermined minimum threshold value, and wherein the radio base station is configured to communicate with the mobile terminal using a half-duplex transmission scheme.

7. The node according to claim 6, wherein the processor is configured to modify the periodic downlink/uplink, half-duplex, subframe transmission pattern with a rule forcing certain subframes to be used for downlink transmission even if they are uplink subframes according to the periodic downlink/uplink, half-duplex, subframe transmission pattern.

8. The node according to claim 6, wherein the node is a radio base station.

* * * * *